United States Patent
Swidersky et al.

(10) Patent No.: US 6,733,598 B2
(45) Date of Patent: May 11, 2004

(54) BRAZING FLUX FOR DRY APPLICATION

(75) Inventors: Hans-Walter Swidersky, Hannover (DE); Alfred Ottmann, Hannover (DE); Heinz-Joachim Belt, Burgwedel (DE)

(73) Assignee: Solvay Fluor und Derivate GmbH, Hannover (DE)

( * ) Notice: Subject to any disclaimer, the term of this patent is extended or adjusted under 35 U.S.C. 154(b) by 0 days.

(21) Appl. No.: 10/128,517

(22) Filed: Apr. 24, 2002

(65) Prior Publication Data

US 2003/0071110 A1 Apr. 17, 2003

Related U.S. Application Data

(63) Continuation of application No. PCT/EP00/10300, filed on Oct. 19, 2000.

(30) Foreign Application Priority Data

Oct. 25, 1999 (DE) .......................... 199 51 454
Oct. 5, 2000 (DE) .......................... 100 49 315

(51) Int. Cl.$^7$ ................................ B23K 35/363
(52) U.S. Cl. ........................... 148/23; 148/24
(58) Field of Search ........................... 148/23

(56) References Cited

U.S. PATENT DOCUMENTS

| | | | | |
|---|---|---|---|---|
| 4,670,067 A | * | 6/1987 | Suzuki et al. ............ | 148/26 |
| 4,689,092 A | * | 8/1987 | Suzuki et al. ............ | 148/26 |
| 4,989,775 A | | 2/1991 | Shimajiri et al. | |

FOREIGN PATENT DOCUMENTS

| DE | 19845758 | 4/2000 |
|---|---|---|
| WO | 82/02014 | 6/1982 |

* cited by examiner

Primary Examiner—Daniel Jenkins
(74) Attorney, Agent, or Firm—Crowell & Moring LLP

(57) ABSTRACT

A flux based on alkali fluoroaluminate is described which is highly suitable for dry application ("dry fluxing"). This is a flux which is free of fine-grained fraction, which is defined by a range of grain-size distribution.

3 Claims, 6 Drawing Sheets

BRAZING FLUX FOR DRY APPLICATION

CROSS REFERENCE TO RELATED APPLICATIONS

This application is a continuation of international patent application no. PCT/EP00/10300, filed Oct. 19, 2000, designating the United States of America, the entire disclosure of which is incorporated herein by reference. Priority is claimed based on Federal Republic of Germany patent applications no. DE 199 51 454.2, filed Oct. 25, 1999, and no. DE 100 49 315.7, filed Oct. 5, 2000.

BACKGROUND OF THE INVENTION

The invention relates to a flux which can be used for dry application, and to the use thereof as a brazing flux.

For many years, it has been known to braze together components of aluminium or aluminium alloys, in particular heat exchangers for the automobile industry, using fluxes based on alkali fluoroaluminate. In such a case, the flux is usually sprayed on to the heat exchangers as an aqueous suspension. In the presence of a brazing composition or of a braze-forming precursor such as silicon powder or potassium fluorosilicate, a stable, non-corrosive compound is formed upon heating the components to a temperature above the melting point of the flux. A process has indeed already been disclosed by published German patent application no. DE-OS 197 49 042 with which the waste water produced in this procedure can be recirculated. However, other process parameters are critical: the concentration of the flux slurry must be monitored, the heat exchangers must be dried before heating, the flux slurries, which are likewise recirculated, may pick up impurities. These disadvantages can be avoided if the flux is applied dry to the components to be joined. This is the case in the dry-flux process. Therein, the dry flux powder is applied to the components electrostatically. The advantage is that no slurries need to be produced, that the concentration of the slurry does not need to be monitored, that it is not necessary to provide a separate drying stage for the components, and that no waste water is produced.

SUMMARY OF THE INVENTION

It is an object of the present invention to provide an improved brazing flux based on alkali fluoroaluminate.

Another object of the invention is to provide a brazing flux which can be conveyed well pneumatically and can be sprayed well in the dry state.

A further object of the invention is to provide a brazing flux which adheres well to components on which it is sprayed and is therefore suitable for the method of dry application (dry fluxing).

These and other objects are achieved in accordance with the present invention by providing an alkali fluoroaluminate flux which can be used for dry application, said flux having a particle volume distribution lying within the area bounded by Curves 1 and 2 of FIG. 10.

In accordance with a further aspect of the invention, the objects are achieved by providing a process for joining components of aluminium or aluminium alloy, said process comprising applying a flux having a particle volume distribution lying within the area bounded by Curves 1 and 2 of FIG. 10 to the components to be joined, the flux being applied dry and electrostatically charged, and thereafter heating the components to braze them together.

The invention is based on the finding that the particle size or the grain-size distribution of the alkali fluoroaluminate fluxes has an influence on the pneumatic transport, the spraying ability and the adhesive power of the flux particles on the components. It was discovered that it is advantageous if smaller and larger particles are contained in the flux and the ratio thereof is subject to certain rules.

The flux composed of alkali fluoroaluminate according to the invention which can be used for dry application (dry fluxing) is characterised in that the volume distribution of the particles lies substantially within Curves 1 and 2 of FIG. 10. The particle-size distribution was determined by laser diffraction.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 11:
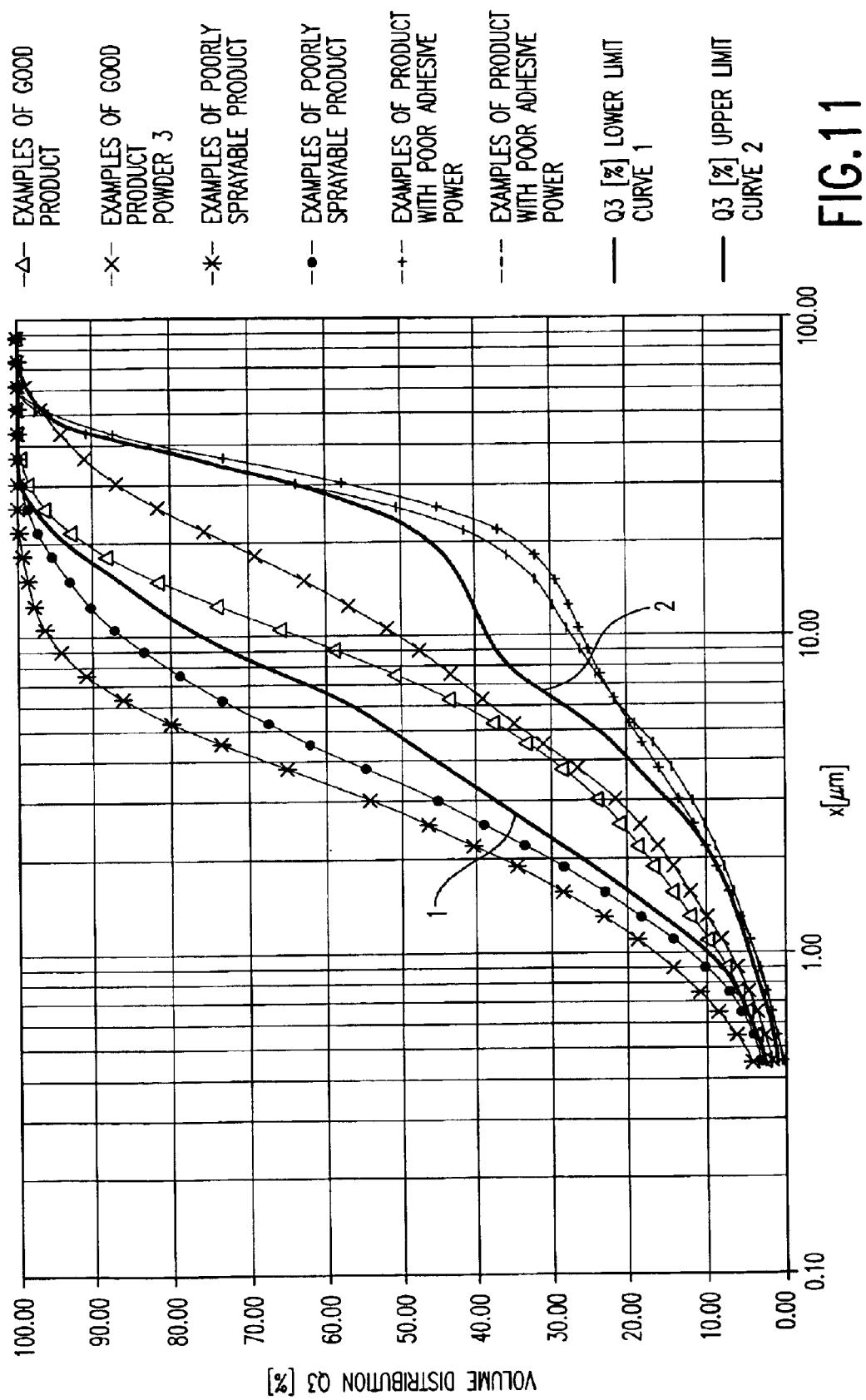

In a preferred flux, the volume distribution of the particles lies substantially within Curves 1 and 2 of FIG. 11.

Figure 10:
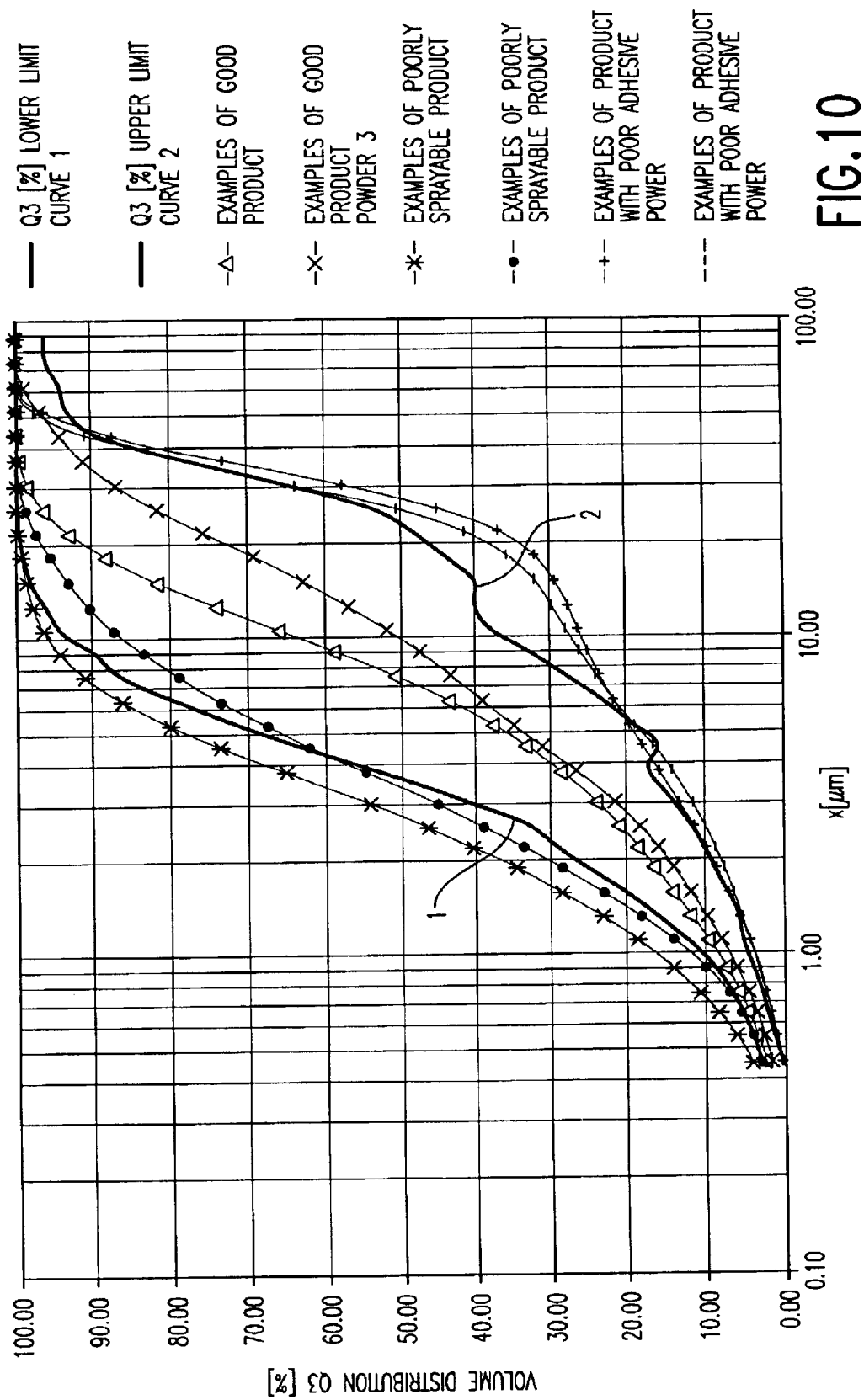
FIGS. 10 and 11 are diagrams which show upper and lower limits for the volume distribution Q3 in percent verses particle size in $\mu$m for the products of the invention as well as the results obtained with various example products.

FIG. 10 shows the lower limit (Curve 1) and the upper limit (Curve 2) for volume distribution curves of usable powders within the scope of the present invention. This is the volume distribution in % of the powders, cumulated, plotted against the particle size. Flux powders, the cumulative volume distribution of which lies on or within Curves 1 and 2 of FIG. 10, are powders within the scope of the invention.

The cumulative volume distribution of Curves 1 and 2 of FIG. 10 plotted against particle size is set forth in Table A below.

TABLE A

Cumulative volume distribution plotted against particle size of Curves 1 and 2 of FIG. 10

| x[$\mu$m] | Q3 [%] Lower limit | Q3 [%] Upper limit |
|---|---|---|
| 0.45 | 0.25 | 3.00 |
| 0.55 | 1.40 | 4.00 |
| 0.65 | 2.00 | 5.30 |
| 0.75 | 2.70 | 6.80 |
| 0.90 | 3.80 | 8.80 |
| 1.10 | 5.00 | 12.20 |
| 1.30 | 5.80 | 15.80 |
| 1.55 | 7.00 | 20.00 |
| 1.85 | 8.50 | 25.00 |
| 2.15 | 10.00 | 29.00 |
| 2.50 | 11.50 | 32.50 |
| 3.00 | 14.00 | 41.00 |
| 3.75 | 17.00 | 53.00 |
| 4.50 | 16.00 | 63.00 |
| 5.25 | 19.00 | 71.00 |
| 6.25 | 23.00 | 79.00 |
| 7.50 | 28.00 | 86.00 |
| 9.00 | 33.00 | 90.00 |

TABLE A-continued

Cumulative volume distribution plotted against particle size of Curves 1 and 2 of FIG. 10

| x[μm] | Q3 [%] Lower limit | Q3 [%] Upper limit |
|---|---|---|
| 10.50 | 38.00 | 94.00 |
| 12.50 | 40.00 | 96.00 |
| 15.00 | 42.00 | 98.00 |
| 18.00 | 44.00 | 98.70 |
| 21.50 | 48.00 | 99.50 |
| 25.50 | 54.00 | 100.00 |
| 30.50 | 65.00 | 100.00 |
| 36.50 | 77.50 | 100.00 |
| 43.50 | 89.00 | 100.00 |
| 51.50 | 93.00 | 100.00 |
| 61.50 | 94.00 | 100.00 |
| 73.50 | 95.80 | 100.00 |
| 87.50 | 96.00 | 100.00 |

Lower limit = Curve 1
Upper limit = Curve 2

Selection example: 40% of the volume is made up of particles having a diameter of 12.5 μm or less.

It was established that fluxes having a cumulative volume distribution on or within Curves 1 and 2 of FIG. 11 have particularly advantageous dry flux properties. Table B shows the numerical values of the cumulative volume distribution plotted against the particle size of Curves 1 and 2 of FIG. 11.

TABLE B

Cumulative volume distribution of the particle size of Curves 1 and 2 of FIG. 11

| x[μm] | Q3 [%] Lower limit | Q3 [%] Upper limit |
|---|---|---|
| 0.45 | 0.94 | 2.28 |
| 0.55 | 1.53 | 3.49 |
| 0.65 | 2.19 | 4.73 |
| 0.75 | 2.91 | 6.00 |
| 0.90 | 3.91 | 8.07 |
| 1.10 | 4.97 | 11.69 |
| 1.30 | 5.89 | 15.30 |
| 1.55 | 7.03 | 19.58 |
| 1.85 | 8.43 | 24.20 |
| 2.15 | 9.91 | 28.19 |
| 2.50 | 11.76 | 32.18 |
| 3.00 | 14.58 | 37.01 |
| 3.75 | 18.94 | 43.07 |
| 4.50 | 22.24 | 48.09 |
| 5.25 | 25.31 | 52.30 |
| 6.25 | 29.74 | 57.13 |
| 7.50 | 34.30 | 64.82 |
| 9.00 | 37.26 | 72.07 |
| 10.50 | 38.78 | 77.06 |
| 12.50 | 40.25 | 81.89 |
| 15.00 | 41.87 | 86.27 |
| 18.00 | 44.20 | 91.28 |
| 21.50 | 48.13 | 95.12 |
| 25.50 | 54.67 | 97.45 |
| 30.50 | 65.04 | 98.91 |
| 36.50 | 77.82 | 99.70 |
| 43.50 | 89.38 | 100.00 |
| 51.50 | 96.55 | 100.00 |
| 61.50 | 98.64 | 100.00 |
| 73.50 | 100.00 | 100.00 |
| 87.50 | 100.00 | 100.00 |

Lower limit = Curve 1
Upper limit = Curve 2

The material according to the invention can be obtained by sieving off undesirable grain fractions, by mixing material with different grain-size distribution.

The spraying factor is preferably 25, preferably 35, in particular 45 or more, and the ratio $H_{fluid}$:$H_0$ determined thereby is at least 1.05. The upper limit for the spraying factor was 85, preferably 83.5. The determination of the spraying factor and the ratio of $H_{fluid}$ to $H_0$ (height of the expanded powder relative to the non-expanded powder) are described below.

The material according to the invention is very highly suitable for use as a flux in the dry fluxing process. In that process, the powder is introduced by compressed air or nitrogen from the storage container into a "spraygun" and is electrostatically charged therein. The powder then leaves the spraying head of the spraygun and hits the components to be brazed. The components to be brazed are then brazed, optionally assembled, in a brazing furnace, usually under inert gas for nitrogen, or by torch brazing.

The powder according to the invention has application-related advantages compared with known fluxes. For example, it has very good flow behavior. This is ascribed to the selected distribution of particle size. This good flow behaviour results in the tendency to clogging ("build-up") being reduced. The material can be electrically charged very well. The material adheres very well to the components to be brazed. The flow of material is very uniform.

The invention will be explained further with reference to the following examples, without limiting its scope.

EXAMPLES

Determination of the Volume Distribution

System: Sympatec HELOS

Manufacturer: Sympatec GmbH, System-Partikel-Technik

Set-Up:

Measuring Apparatus for Determining Particle-Size Distributions of Solids by Means of Laser Diffraction The apparatus was comprised of the following components: laser light source with beam formation means, measuring zone in which the particles to be measured interact with the laser light, an imaging lens which converts the angular distribution of the diffracted laser light into a location distribution on a photodetector, a multi-element photodetector with autofocus unit and subsequent electronics which digitise the measured intensity distribution.

The particle-size distribution was calculated using the software WINDOX. The principle is based on the evaluation of the measured intensity distribution of the diffraction pattern (according to Fraunhofer). In the present case HRLD (high-resolution laser diffraction). The particle size of non-spherical particles is reproduced as an equivalent diameter distribution of spheres of identical diffraction. Before measurement, agglomerates have to be broken down into individual particles. The aerosol of the powder which is required for measurement is produced in a dispersing apparatus, in this case RODOS system. The uniform supply of the powder to the dispersing apparatus is effected by means of a vibrating conveyor (VIBRI).

Measuring range: 0.45 ... 87.5 μm

Evaluation: HRLD (version 3.3 Rel.1)

Density of the Sample:

Setting: 1 g/cm³

Form factor: 1 complex refractive index m=n−ik; n=1; i=0

| | Evaluation: |
|---|---|
| x | is the particle diameter in μm. |
| $Q^3$ | is the cumulative volume percentage of the particles up to the diameter listed. |
| $q^3$ | is the density distribution for the particle diameter x |
| x10 | is the particle diameter at which the cumulative volume percentage reaches 10%. |
| c_opt | is the optical concentration (aerosol density) which occurred upon measurement. |

M1.3 and Sv were not used for evaluation.

Starting Material

Figure 1:
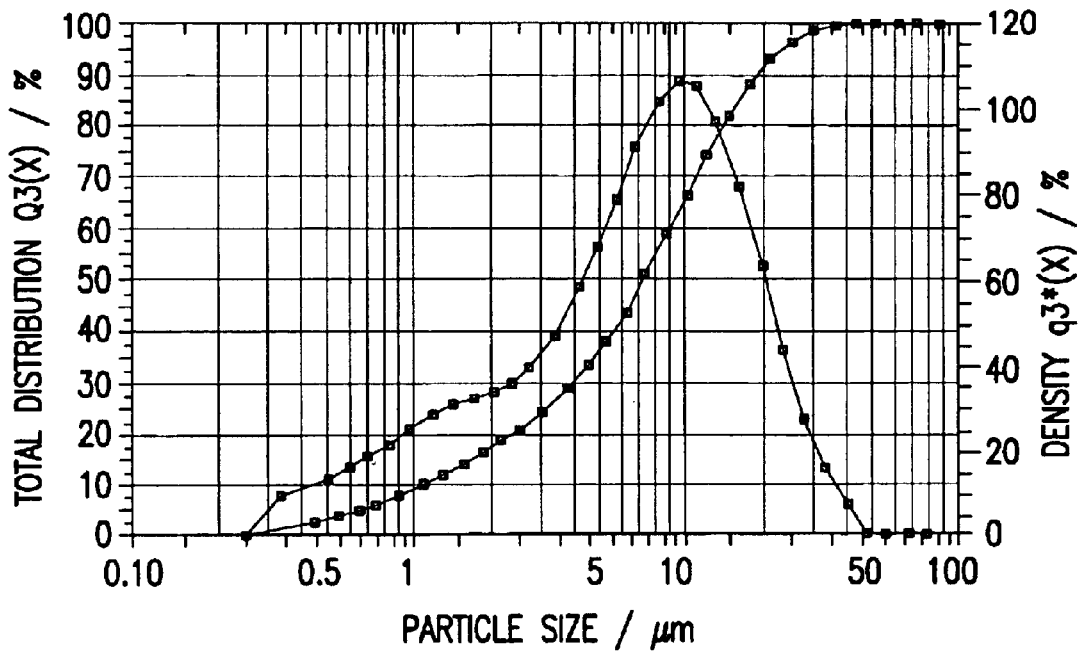
FIG. 1 is a graph showing the particle size distribution of a first alkali metal fluoroaluminate flux powder according to the invention.
Figure 2:
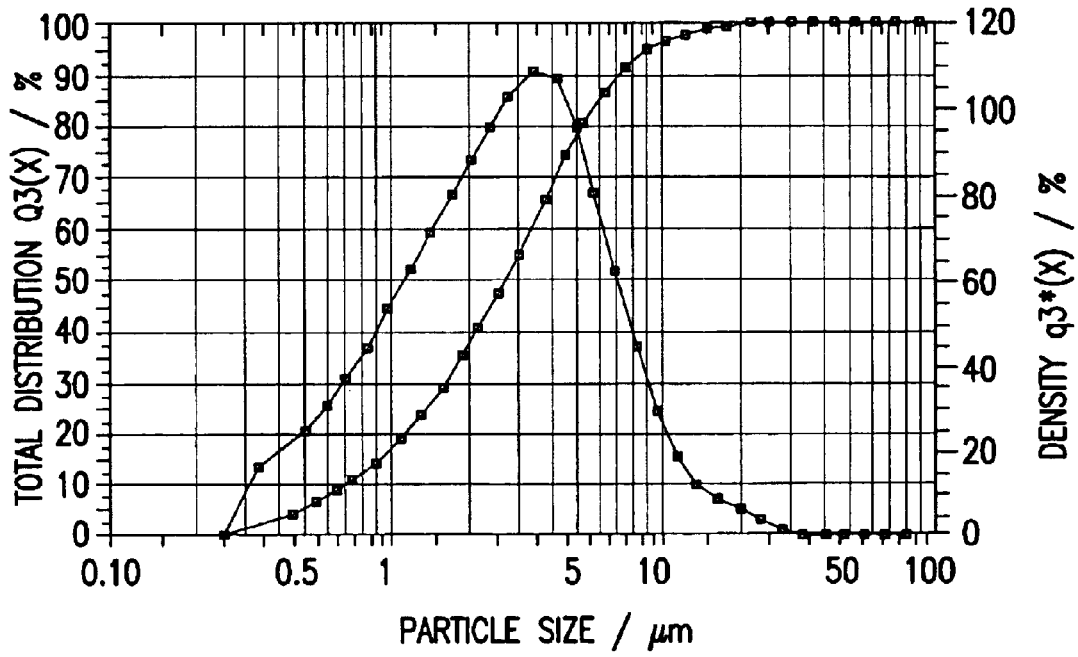
FIG. 2 is a graph showing the particle size distribution of a second alkali metal fluoroaluminate flux powder according to the invention.

Two powders composed of potassium fluoroaluminate with different grain-size distributions were investigated in terms of their properties for dry fluxing. The powders are obtainable by sieving out undesirable grain fractions. The grain-size distribution (volume distribution) is compiled below in table form. The particle-size distribution of Powder 1 ("coarser" material) is shown visually in FIG. 1, and of Powder 2 ("finer" material) in FIG. 2.

TABLE 1

Volume distribution of Powder 1
Volume distribution

| x0/μm | Q3/% | x0/μm | Q3/% | x0/μm | Q3/% | x0/μm | Q3/% |
|---|---|---|---|---|---|---|---|
| 0.45 | 2.27 | 1.85 | 16.42 | 7.50 | 50.85 | 30.50 | 98.21 |
| 0.55 | 3.40 | 2.15 | 18.61 | 9.00 | 58.91 | 36.50 | 99.44 |
| 0.65 | 4.55 | 2.50 | 20.94 | 10.50 | 66.02 | 43.50 | 100.00 |
| 0.75 | 5.70 | 3.00 | 24.07 | 12.50 | 73.96 | 51.50 | 100.00 |
| 0.90 | 7.41 | 3.75 | 28.64 | 15.00 | 81.58 | 61.50 | 100.00 |
| 1.10 | 9.59 | 4.50 | 33.19 | 18.00 | 88.02 | 73.50 | 100.00 |
| 1.30 | 11.63 | 5.25 | 37.70 | 21.50 | 92.85 | 87.50 | 100.00 |
| 1.55 | 13.95 | 6.25 | 43.64 | 25.50 | 96.08 | — | — | x10 = 1.14 μm    x50 = 7.35 μm    x90 = 19.44 μm
Sv = 2.033 m²/cm³    Sm = 8132 cm²/g    copt = 6.27%

TABLE 2

Volume distribution of Powder 2
Volume distribution

| x0/μm | Q3/% | x0/μm | Q3/% | x0/μm | Q3/% | x0/μm | Q3/% |
|---|---|---|---|---|---|---|---|
| 0.45 | 4.03 | 1.85 | 334.62 | 7.50 | 90.93 | 30.50 | 100.00 |
| 0.55 | 6.13 | 2.15 | 40.35 | 9.00 | 94.38 | 36.50 | 100.00 |
| 0.65 | 8.33 | 2.50 | 46.57 | 10.50 | 96.30 | 43.50 | 100.00 |
| 0.75 | 10.59 | 3.00 | 54.65 | 12.50 | 97.69 | 51.50 | 100.00 |
| 0.90 | 14.03 | 3.75 | 65.19 | 15.00 | 98.59 | 61.50 | 100.00 |
| 1.10 | 18.60 | 4.50 | 73.63 | 18.00 | 99.22 | 73.50 | 100.00 |
| 1.30 | 23.09 | 5.25 | 80.00 | 21.50 | 99.68 | 87.50 | 100.00 |
| 1.55 | 28.49 | 6.25 | 86.05 | 25.50 | 99.93 | — | — | x10 = 0.72 μm    x50 = 2.71 μm    x90 = 7.26 μm
Sv = 3.6046 m²/cm³    Sm = 14418 cm²/g    copt = 6.74%

Initially, the fluidizing ability and the flow ability of Powders 1 and 2 and certain mixtures of both were investigated.

Apparatus and Procedure Used

A measuring apparatus for determining the powder fluidizing ability and powder flow ability (Binks-Sames powder fluidity indicator AS 100–451 195) was constructed on a vibration unit (Fritsch L-24). The measuring apparatus had a fluidizing cylinder with a porous membrane at the bottom. 250 g of the powder to be investigated in each case was introduced into the cylinder, the vibration unit was switched on, and a uniform flow (controlled by a flow meter) of dry nitrogen was introduced through the porous membrane into the powder. The powder expanded; in order to adjust the equilibrium, the gas was allowed to act for 1 minute. The fluidizing ability of the respective powder can be determined by measuring the height before and after expansion.

The fluidizing ability and flow ability of the respective powder were determined by means of the so-called "spraying factor". The spraying factor is a combination of the expansion factor (fluidizing ability) and the mass flow of the powder (flow ability). The spraying factor represents an important factor for dry flux application. It was determined as follows: as already described above, the powder to be investigated in each case was expanded in the fluidizing cylinder. Then a hole formed in the side of the cylinder was opened for 30 seconds, and the powder leaving the cylinder through this hole was collected in a beaker and weighed. The ratio of the quantity of powder collected relative to the unit of time of 0.5 minutes is referred to hereinafter as the "spraying factor". In explanation, it should be mentioned that highly fluidizable, flowable powders have a spraying factor of 140. Very poorly expandable, poorly flowable powders have, for example, a spraying factor of 7. Table 3 below gives the spraying factors determined for pure Powder 1, pure Powder 2 and intermediate mixtures containing 90, 80, 70 . . . 10% by weight of Powder 1, remainder Powder 2 to make up to 100% by weight.

TABLE 3

| Powder 1 (%) | Powder 2 (%) | Spraying factor[1] (g/0.5 min.) |
|---|---|---|
| 100 | 0 | 71.88 |
| 90 | 10 | 63.56 |
| 80 | 20 | 35.54 |
| 70 | 30 | 25.33 |
| 60 | 40 | 22.51 |
| 50 | 50 | 21.52 |
| 40 | 60 | 14.76 |
| 30 | 70 | 13.83 |
| 20 | 80 | 11.28 |
| 10 | 90 | 9.77 |
| 0 | 100 | 7.35 |

[1]Average of several measurements

In tests it was determined that good flow behavior is obtained for a spraying factor of more than about 45 g/0.5 min.

The spraying factor can also be calculated as follows:
a) The expansion factor is calculated (cm/cm):
   $H_{fluid}:H_0$ with $H_{fluid}$=height of the expanded powder, $H_0$=height of the non-fluidized powder, vibrator switched
   off and supply of nitrogen stopped.
   The average of five measurements in each case of measuring points distributed over the diameter was determined.
b) Flow of the powder in (g/0.5 min):
   The weight of the powder which flows out of the hole in
   0.5 min is determined as median value of 10 measurements.

Calculation of the Median

Figure 3:
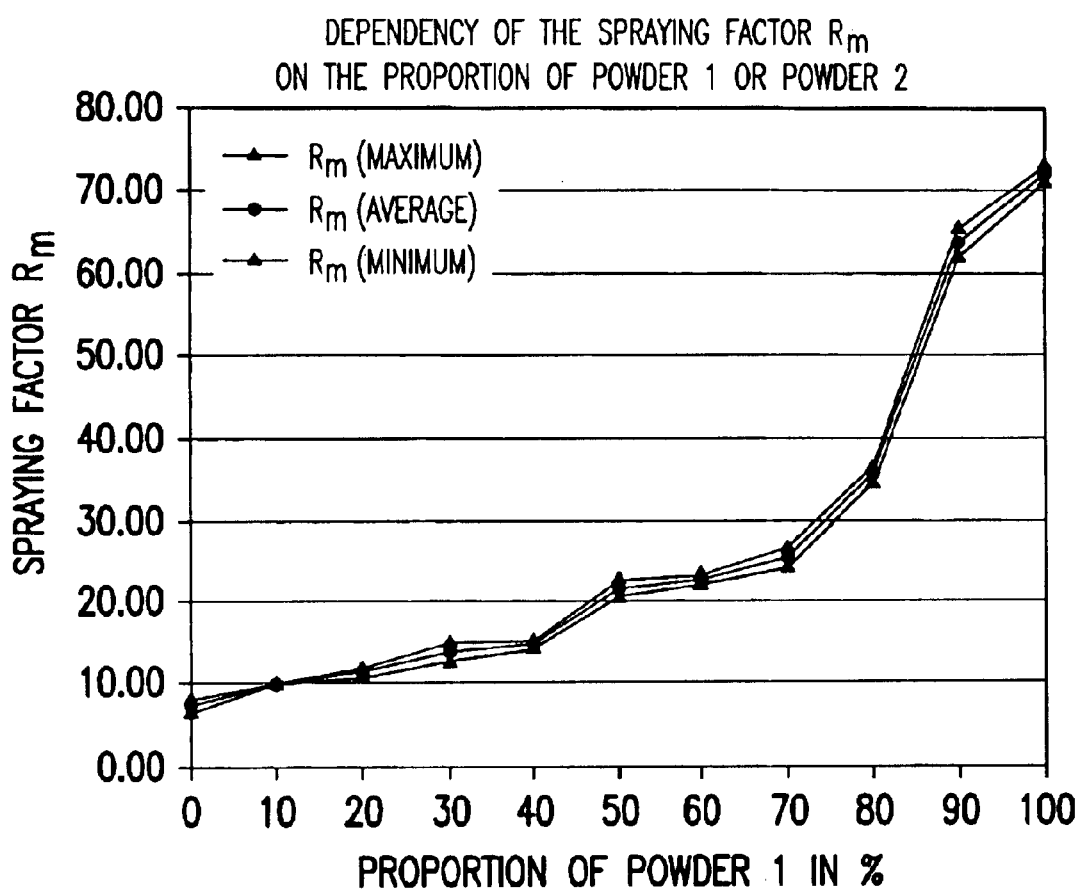
FIG. 3 is a graph showing the dependence of the "spray factor" ($R_m$) on the proportions of representative flux powders.
Figure 4:
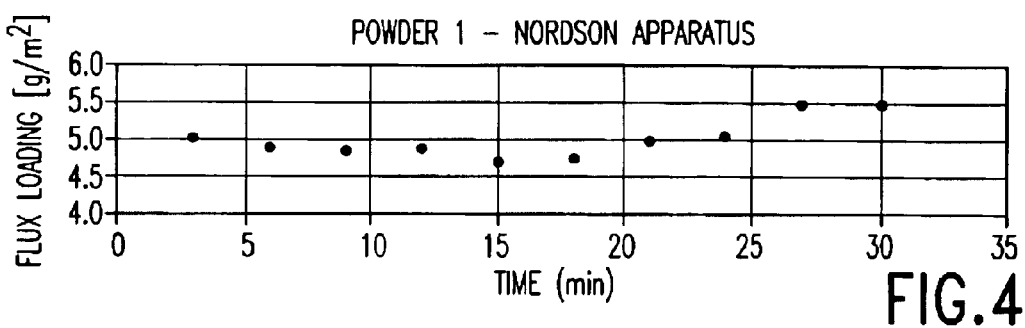
FIGS. 4 through 9 are plots of flux loading over time for representative flux powders with different apparatuses.

Median $m=m_9+m_2/2$ for 10 individual measurements with
$m_5<m_3<m_1<m_7<m_9<m_2<m_4<m_8<m_{10}<m_6$ The spraying factor $R_m$ is then:
$R_m$(g/0.5 min)=m(g/0.5 min) expansion factor Very surprisingly, the spraying factor did not change linearly with the composition of the powder mixture, but exhibited a strong jump in the properties in the range of about 80–90% of the proportion of Sample 1. This is shown graphically in FIG. 3. The spraying factor is plotted in g/0.5 min against the percentage of the Powder 1 in the mixture. This proves that the content of fines in the powder has a great influence on the flow ability.

Investigation of the Adhesive Power on Aluminium Components as a Function of the Grain-Size Distribution The adhesive power was tested by a very simple method which permits good conclusions to be drawn about the industrial usability of the powders investigated for dry fluxing.

A flat, square aluminium plate 0.5 m×0.5 m in size was electrostatically spray-coated on one side with the dry flux powder which was to be investigated. The loading with flux was determined by weighing. The plate was then dropped on to the ground in a vertical position from a height of 5 cm and the loss of flux was noted as a percentage of the original flux loading. Ten measurements were performed for each of the powders. Poorly adhering powders had a comparatively high weight loss compared with the low weight loss when using powders according to the invention (see Powder 3 and Powder 4).

Investigations Under Conditions Approximating Actual Use

Two different apparatus were used. One apparatus was a flux application apparatus ("fluxing booth") manufactured by Nordson, suitable for semicontinuous application. Dimensions of the unit: 216 cm high, 143 cm wide, 270 cm deep. The most important components were a storage container, a spraygun, two filter cartridges and the control units. The component to be fluxed was placed on a grate which could be moved back and forth manually. The spraygun moved automatically from left to right and back again at intervals of about 21 seconds (21 seconds for 65 cm, i.e. the speed was 3.1 cm/sec.).

As a second fluxing unit, a container from ITW/Gema together with a spraygun and control unit was incorporated in this system. The distance between the spraying heads and the grate was 34 cm.

Principle of Operation

The Nordson container utilizes the principle of powder fluidization in order to introduce the flux into the spraygun via a venturi pump and a feed hose. A stirring or shaking device in the container supported the fluidization of the flux.

The ITW/Gema system had a container which had screw conveyors ("helix screw conveyors") for conveying the powder mechanically into a funnel. A venturi pump then conveyed the flux through a hose into the spraygun. The ITW/Gema system was equipped with vibrators at some points in order to avoid clogging by the flux. The sprayguns operated at 100 kV for charging the powder.

The powders listed in the examples were used in the Nordson and ITW/Gema apparatus in order to investigate the uniformity of flux transport and the spraying operation and the loading of test pieces (heat exchangers having a surface area of 4.8 m²). First the control units were adjusted relative to the air throughflow and the screw speed such that flux loading of approximately 5 g/m² was achieved. Then the experiment was continued for 30 minutes without changing the setting of the apparatus. At intervals of 2–4 minutes, test pieces were placed on the grate for spraying with flux, and then were weighed out to determine the flux loading. Each test series comprised 10 or 11 measurements. The results are set forth in Table 4.

TABLE 4

30-minute test, flux loading on heat exchangers

| Target loading: | Powder 1 Flux loading (g/m2) | | | Powder 2 Flux loading (g/m2) | | |
|---|---|---|---|---|---|---|
| 5 g/m2 | min. | max. | difference | min. | max. | difference |
| Nordson | 4.8 | 5.5 | 0.7 | 4.6 | 6.0 | 1.4 |
| ITW/Gema | 4.8 | 5.3 | 0.5 | 5.0 | 5.5 | 0.5 |

FIGS. 4 to 7 show the flux loadings for the Nordson apparatus and the ITW/Gema apparatus plotted against time for Powder 1 and Powder 2 in graph form. For Powder 2, the spraying head of the Nordson apparatus had to be blown free regularly in order to avoid clogging.

Figure 5:
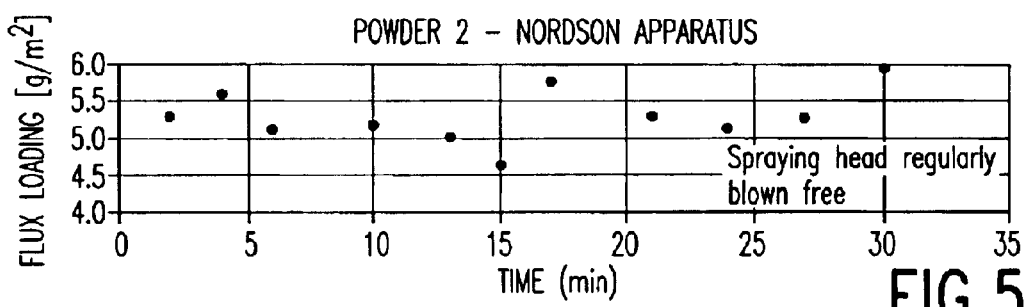
Figure 6:
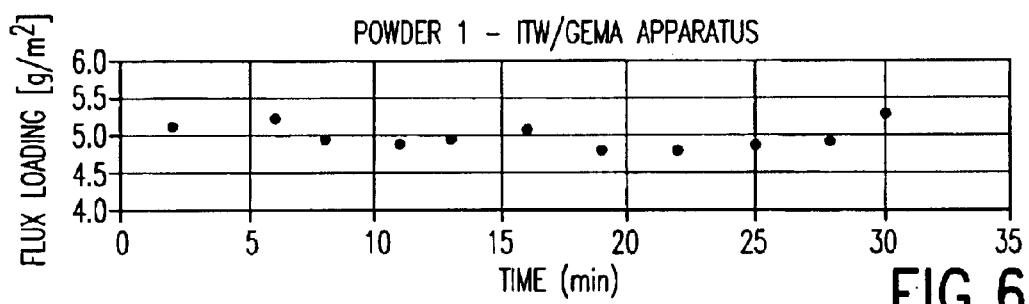
Figure 7:
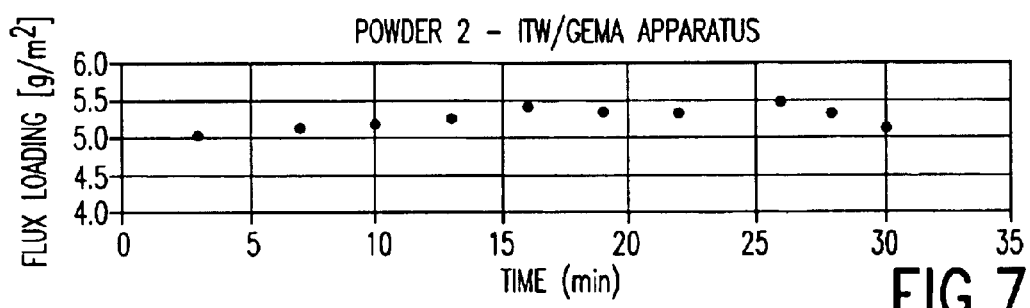
Figure 8:
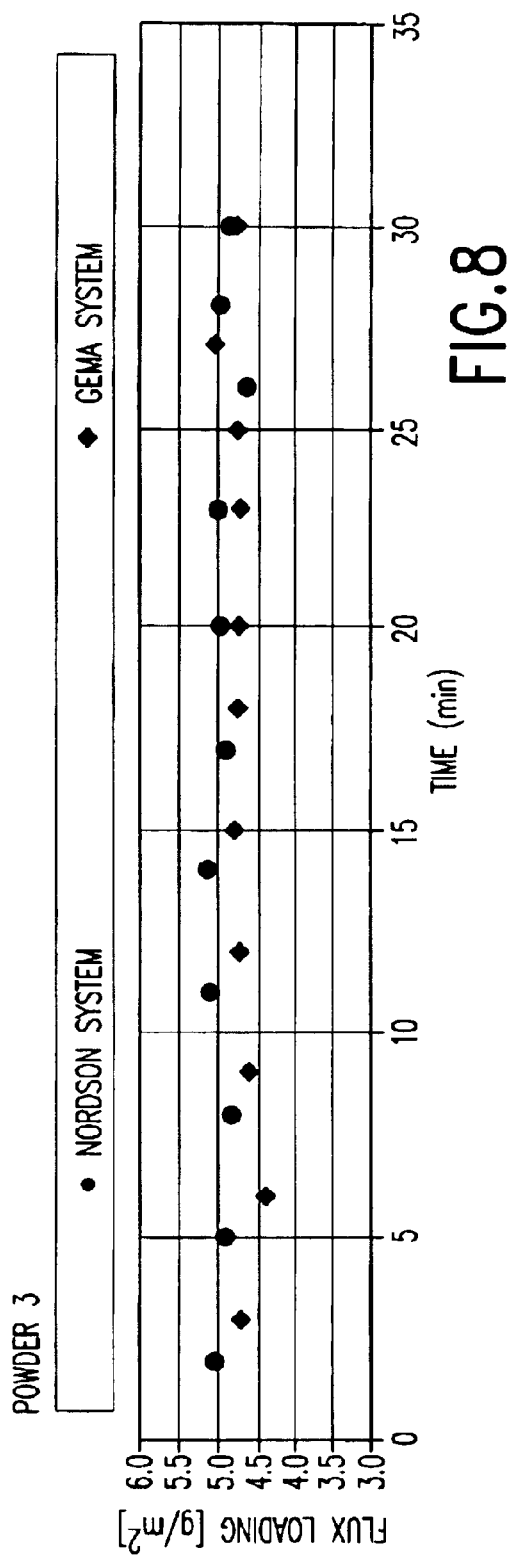
Figure 9:
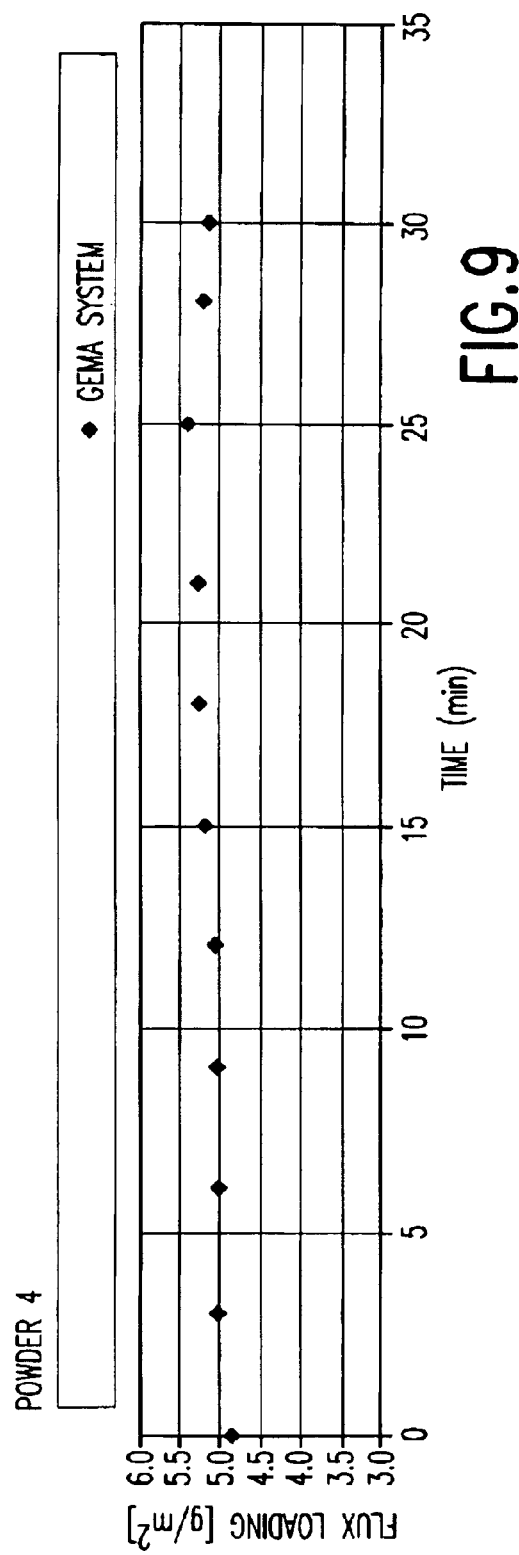

The 30-minute test investigations as described above were performed for additional powders. Powder 3 had the following properties: a measured value of $R_m$ of 59.25; $H_{fluid}:H_0$ (mm/mm)=1.11; a loss of adhesion of 11.5%; and the following particle-size distribution: 90% of all particles had a size of <35.15 μm; 50% of all particles had a size of <9.76 μm, 10% of all particles had a size of <1.35 μm. A peak maximum of the grain-size distribution was at 5 μm, and the second-largest peak was at 20 μm. The totalled volume distribution of this powder is shown in FIGS. 5 and 6 as an example of readily usable powder. This material yielded very good results both in the Nordson apparatus and in the ITW/Gema apparatus. "Spitting" was not observed in the apparatus, and nor was it necessary to blow off the spraying head. The layer produced was "very attractive". The flux coverage plotted against time is shown in FIG. 8. A further material was Powder 4, and it had a spraying factor of $R_m$=82.85; $H_{fluid}:H_0$ was 1.10; the loss in the adhesion test was 16.7%; the particle-size distribution: 90% of all particles had a diameter of less than 28.6 μm; 50% of all particles had a diameter of 8.9 μm; 10% of all particles had a diameter of less than 1.67 μm; the grain-size distribution had a peak at 9.5 and at 20 μm, and this material too yielded excellent results. FIG. 9 shows the uniformity of the flux coating with Powder 4 on the heat exchanger plotted against time.

Acceptable results were also obtained with the following potassium fluoroaluminate Powder 5: $R_m$=46.99; ratio $H_{fluid}:H_0$=1.05, loss coverage: 6.39%, particle-size, distribution: 90% of all particles <19.84 μm; 50% of all particles <7.7 μm; 10% of all particles <1.16 μm, max. peak of the grain-size distribution at 13.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. An alkali fluoroaluminate flux which can be used for dry application, said flux having a particle volume distribution lying within the area bounded by Curves 1 and 2 of FIG. 10, wherein particles having a diameter of up to 0.45 μm have a cumulative volume between 0.25% and 3% of a total particle volume.

2. A flux according to claim 1, wherein said flux has a particle volume distribution lying within the area hounded by Curves 1 and 2 of FIG. 11, and wherein particles having a diameter of up to 0.45 μm have a cumulative volume between 0.95% and 2.28% of the total particle volume.

3. A flux according to claim 1, wherein said flux is a potassium fluoroaluminate flux.

* * * * *